Dec. 22, 1942.     R. A. BRIGGS, JR     2,306,010
AIR CLEANER
Filed May 29, 1941
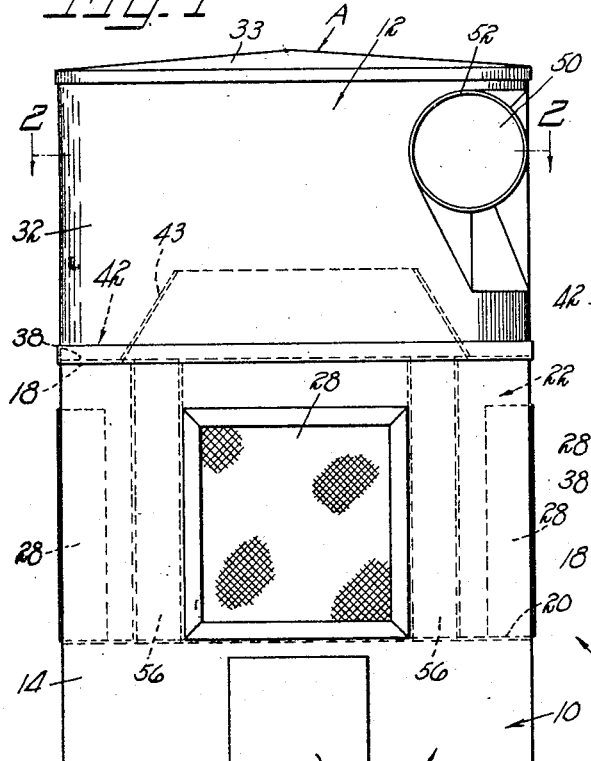
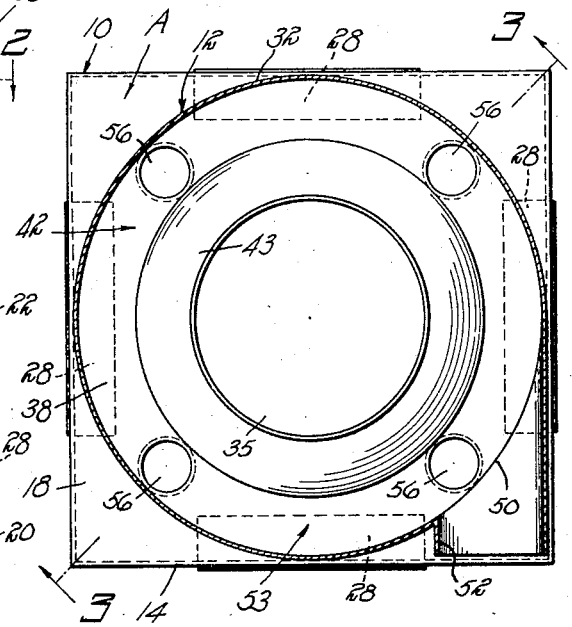
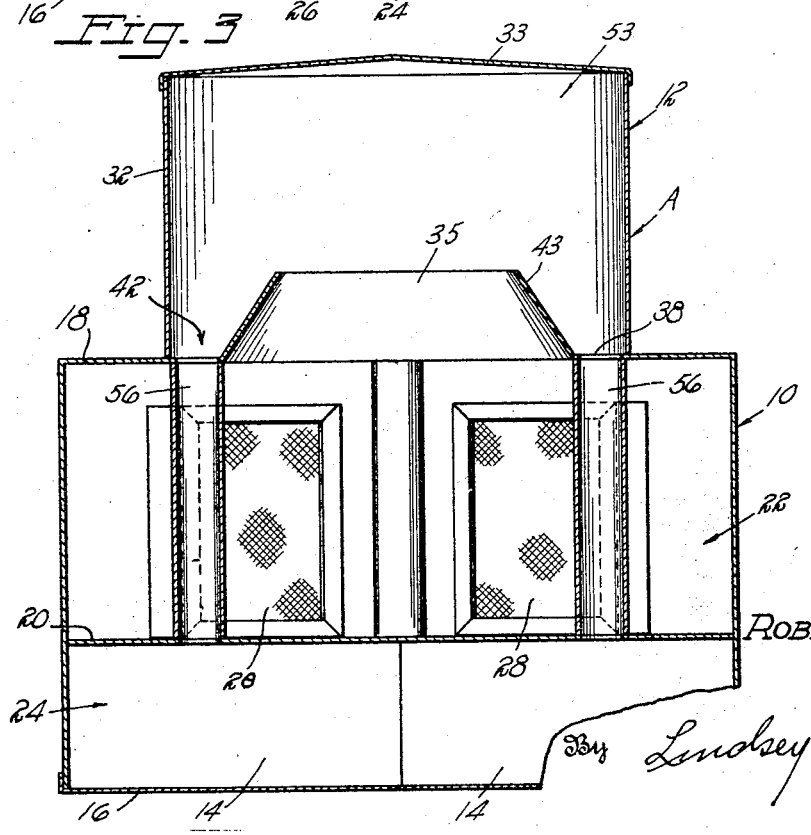
Inventor
ROBERT A. BRIGGS, JR.
By Lindsey and Robillard
Attorneys Patented Dec. 22, 1942

2,306,010

UNITED STATES PATENT OFFICE 2,306,010

AIR CLEANER

Robert A. Briggs, Jr., West Hartford, Conn., assignor to Colonial Blower Company, Hartford, Conn., a corporation of Connecticut Application May 29, 1941, Serial No. 395,703

4 Claims. (Cl. 183—67)

The present invention relates to air cleaners and more particularly to a dust separator and collector intended for indoor installation. In this type of separator it is customary to use a filter having any suitable filtering material for the purpose of trapping the dust particles from the conveying stream of air. However, it has been found that when this type of separator has been used for collecting large dust particles, such, for example, as cuttings resulting from grinding, the filtering material rapidly clogs necessitating frequent cleaning and renewal, as well as limiting the capacity of the collector.

The object of the present invention is to provide a collector and separator of the above indicated type which is particularly adapted to handle large volumes of heavy dust laden air in such a manner that the heavy particles will be initially separated from the air stream and will gravitate to a position where they can be readily removed from the collector without removing the filters and where due to the initial removal of the heavy particles the filters will only be called upon to remove small and lighter matter, thus substantially prolonging the period between cleanings and renewals.

A further object is to provide a dust collector and separator of the above indicated type which is built as a compact unit which may be efficiently and economically manufactured and may be easily transported and installed at any desired location.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the accompanying drawing:

Figure 1 is a side view of a collecting and separating unit embodying the invention herein;

Fig. 2 is a cross-sectional view taken on the line 2—2 of Figure 1; and

Fig. 3 is a view taken on the line 3—3 of Fig. 2.

Referring to the drawing the separator and collector comprises generally a compact unit A including a lower member 10 and an upper member 12. For convenience in manufacture the lower member 10 is made of suitable sheet metal and is here shown constructed in the form of a cube having side walls 14, a bottom plate 16 and a top plate 18. Spaced adjacent the bottom plate 16 and interior of the lower member 10 is a partition plate 20 dividing the lower member into a filtering chamber 22 and dust collector 24. The aforementioned parts may be secured in any suitable manner, such as by welding or by riveting or bolting same to angle irons and straps, but as these details of construction are well known they have, for purposes of simplicity, been omitted. With the partition plate 10 arranged to divide the lower member into a filtering chamber 22 and a dust collector 24, there is further located in one side wall and beneath the partition plate a cleanout door 26 and located in each of the side walls above the partition plate is a readily removable filter 28, the purposes of these parts being presently apparent.

With the lower member 12 so constructed the top plate 18 serves as a support for cylindrical wall 32 of the upper member 12, the upper end of wall 32 being closed by a top closure 33. As best seen in Figs. 2 and 3 the wall 32 is concentric with but of greater diameter than a circular opening 35 cut in the top plate 18 of the lower member. By cutting the opening 35 of smaller diameter than the wall 32 there is defined an annular ring 38 for spacing a frusto-conical baffle 43 from the wall 32, the baffle having its lower edge secured to the inner peripheral edge of the ring. In this way there is formed a dust receiving trough 42 adjacent the bottom of the upper member and close to the cylindrical wall and a centrally arranged air passage 35 between the upper and lower members. To complete the upper member there is also cut through the wall 32 an opening 50 located at a point above the upper edge of the baffle 43. Aligned with the opening 50 is a conduit 52 arranged to direct an entering stream of air tangential to the wall 32, thus setting up a cyclonic action.

With this arrangement it will be seen that the complete upper member including the trough 42 and inlet 50 define a separating chamber 53 which is in vertical alignment with both the filtering chamber 22 and the dust collector 24. As a result the dust laden air upon entering the separator will initially follow a path closely adhering to the wall 32 whereupon the heavy particles will drop into the dust collecting trough 42 and thereafter the substantially clean air will pass into the filtering chamber 22 and then through the filters 28. If any of the heavy dust should be carried into the filtering chamber 22 it will settle on the partition plate 20 leaving only the minute particles to be trapped by the filters, thereby substantially increasing the time between the cleaning periods as well as the life of the filters. Moreover by constructing the unit in the manner described a substantially large filtering area is obtained which also aids in increasing the time between cleaning periods and renewal of the filters.

In addition means are further provided for permitting the ready removal of the heavy dust particles at any time. This is accomplished by providing a plurality of passages 56 extending between the trough 42 and the dust collector 24. In the present embodiment these passages comprise vertically arranged tubes 56 interconnecting aligned openings provided in the ring 38 comprising the bottom plate of the trough 42 and the partition plate 20. With the passages so arranged the heavy dust particles collecting in the trough will gravitate down and into the dust collector 24 from which they may be readily removed at any time through the cleaning door 26. It will be noted that the passages 56 by-pass the filtering chamber 22 and once the dust settles in the trough 42 and starts to gravitate into the dust collector, it will not be interfered with by the air currents and thus the possibility of being again entrained by the air stream is eliminated. As the amount of heavy particles which carry over into the filtering chamber and settle onto the partition plate will be relatively small these can be removed whenever the filters 28 are removed.

In addition to the advantages heretofore mentioned the arrangement of the chambers in vertical alignment permits ready flow of the air from one to the other with substantially no frictional loss, thus reducing the back pressure created to a minimum whereby a substantially large capacity is obtained. Moreover, this type of unit may be used for removal of dust from types of work which heretofore have created such large particles that it was necessary to dispose of same through a collector arranged exterior of the building, thus resulting in substantial heat losses. These losses do not occur with the type disclosed herein, as the air is all returned within the building.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a unit of the character described, a separating chamber, a filtering chamber and a dust collector arranged in vertical alignment, one below the other, said separating chamber having a cylindrical wall provided with an entrance opening for admitting a dust laden stream tangential to the wall, an annular trough adjacent the bottom of said chamber for collecting the dust falling from the dust laden stream, an outlet central of the trough and leading to the filtering chamber, a plurality of filters providing air outlets from said filtering chamber and for trapping the carried over dust carried by the air passing therethrough, and a plurality of tubes connecting the trough and the dust collector and through which the dust will gravitate into the collector free of disturbance from the air stream.

2. In a unit of the character described, a separating chamber, a filtering chamber, and a dust collector arranged in axial alignment, said separating chamber including a cylindrical wall provided with means for admitting a stream of dust laden air tangential to the wall, whereby the air will initially follow a path closely adhering to the wall, an annular trough provided in said separator adjacent the cylindrical wall and positioned to underlie the initial path of the air to collect the heavy dust particles falling from the air stream, an axial opening between said separator and said filtering chamber disposed centrally of said trough to allow the air to flow from the separator to the filtering chamber, a filter in said filtering chamber providing an opening for the escape of air from said chamber, and connecting passages from said trough to said dust collector, said passages by-passing said filtering chamber to allow the dust to gravitate from the trough into the dust collector free of interference from the air stream.

3. In a unit of the character described, a lower chamber having a side wall and top and bottom plates, a partition plate intermediate of said top and bottom plates dividing said lower member into a filtering chamber and a dust collector located beneath the filtering chamber, a filter provided in the wall of the filtering chamber, the top plate of the lower member being provided with an opening, and a separating chamber supported on said top plate and including a cylindrical wall secured to said top plate and concentric with but of greater diameter than said top plate opening, a closure for the top of said cylindrical wall, an upwardly and inwardly extending baffle secured to the peripheral edge of the top plate opening to define a trough adjacent the bottom of said separating chamber, the cylindrical wall of said chamber being provided with means above said baffle for admitting a dust laden stream of air tangential to the wall and above the trough, and a plurality of passages extending from the bottom of said trough and into the dust collector.

4. In a unit of the character described, the combination of a cylindrical chamber provided with means for admitting a dust laden stream of air tangentially therein, an annular trough positioned in said chamber adjacent the bottom thereof and disposed to underlie the initial path of the dust laden stream for collecting the dust falling from said stream, a filtering chamber located beneath said cylindrical chamber and connected thereto through an outlet disposed centrally of the trough, said filtering chamber having an outlet to permit the escape of air, a filter in said filtering chamber located in the path of air flowing through the outlet to trap any dust carried by the air passing therethrough, a dust collector positioned beneath said trough, and a passage between said trough and dust collector to allow the dust collected in said trough to gravitate into said collector.

ROBERT A. BRIGGS, JR.